US009124697B2

(12) United States Patent
Scott et al.

(10) Patent No.: US 9,124,697 B2
(45) Date of Patent: Sep. 1, 2015

(54) SYSTEM FOR ANALYZING INTERACTIONS AND REPORTING ANALYTIC RESULTS TO HUMAN OPERATED AND SYSTEM INTERFACES IN REAL TIME

(71) Applicant: GENESYS TELECOMMUNICATIONS LABORATORIES, INC., Daly City, CA (US)

(72) Inventors: Mark Scott, Willowdale, CA (US); Jim Barnett, Auburndale, MA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 13/888,318

(22) Filed: May 6, 2013

(65) Prior Publication Data
US 2013/0246053 A1    Sep. 19, 2013

Related U.S. Application Data

(63) Continuation of application No. 12/502,072, filed on Jul. 13, 2009, now Pat. No. 8,463,606.

(51) Int. Cl.
| G10L 15/00 | (2013.01) |
| H04M 3/51  | (2006.01) |
| H04M 3/42  | (2006.01) |
| G10L 17/26 | (2013.01) |

(52) U.S. Cl.
CPC ........ *H04M 3/5175* (2013.01); *H04M 3/42221* (2013.01); *G10L 17/26* (2013.01); *H04M 2201/40* (2013.01); *H04M 2203/301* (2013.01); *H04M 2203/401* (2013.01)

(58) Field of Classification Search
USPC ........................................................ 704/232
See application file for complete search history.

(56) References Cited

U.S. PATENT DOCUMENTS

| 6,308,154 | B1* | 10/2001 | Williams et al. ............... 704/254 |
| 6,363,346 | B1* | 3/2002  | Walters ......................... 704/231 |
| 6,721,416 | B1* | 4/2004  | Farrell ...................... 379/265.07 |
| 6,959,080 | B2* | 10/2005 | Dezonno et al. ........... 379/265.07 |
| 8,463,606 | B2* | 6/2013  | Scott et al. ..................... 704/232 |
| 8,600,756 | B2* | 12/2013 | Pickering et al. ........... 704/270.1 |
| 2004/0062364 | A1* | 4/2004 | Dezonno et al. ........... 379/88.14 |
| 2009/0225971 | A1 | 9/2009 | Miller et al. |
| 2009/0326947 | A1 | 12/2009 | Arnold et al. |
| 2010/0246784 | A1 | 9/2010 | Frazier et al. |
| 2011/0125498 | A1* | 5/2011 | Pickering et al. ............. 704/246 |
| 2011/0178803 | A1* | 7/2011 | Petrushin ...................... 704/270 |
| 2011/0191106 | A1* | 8/2011 | Khor et al. ..................... 704/251 |

* cited by examiner

*Primary Examiner* — Daniel Abebe
(74) *Attorney, Agent, or Firm* — Christie, Parker & Hale, LLP

(57) ABSTRACT

A computerized system for advising one communicant in electronic communication between two or more communicants has apparatus monitoring and recording interaction between the communicants, software executing from a machine-readable medium and providing analytics, the software functions including rendering speech into text, and analyzing the rendered text for topics, performing communicant verification, and detecting changes in communicant emotion. Advice is offered to the one communicant during the interaction, based on results of the analytics.

18 Claims, 8 Drawing Sheets

US 9,124,697 B2

SYSTEM FOR ANALYZING INTERACTIONS AND REPORTING ANALYTIC RESULTS TO HUMAN OPERATED AND SYSTEM INTERFACES IN REAL TIME

CROSS-REFERENCE TO RELATED APPLICATIONS

This application is a continuation application of U.S. application Ser. No. 12/502,072, filed Jul. 13, 2009, the entire content of all of which are incorporated by reference herein.

BACKGROUND OF THE INVENTION

1. Field of the Invention

The present invention is in the field of telephony communications and pertains particularly to methods and apparatus for analyzing telephony interactions and reporting the results of analysis in real time.

2. Discussion of the State of the Art

Call centers are organizations or companies that represent one or more companies providing goods and/or services to a consumer base. Most state-of-art call centers are dual capable meaning that they may handle both switched telephony calls and data network telephony (DNT) calls. A call center typically includes a plurality of workstations comprising computers connected to a local area network (LAN) or equivalent network. Each workstation includes a telephone or equivalent for handling voice calls. Voice calls may also be handled directly n the LAN-connected computers using appropriate telephony software.

Call centers are equipped generally to handle a wide range of interactions including live voice including voice over Internet protocol (VoIP), connection oriented switched telephony (COST) and messaging including email, instant messaging, and chat. Other forms of communication may also be supported like video conferencing, fax correspondence, and network-based applications for collaborating. It is important to a call center that all call center activity is recorded and made available for data mining, training, and other processes that rely on historical data for improvement of the performance of the center. Software adapted to report call center activity are typically part of a call center software suite.

Existing call center reporting packages provide information on calls sorted by called party number or calling party number, and may include information gathered by an interactive voice response system. A problem with such reporting packages is that they often lack information on the content of the conversations that occurred between callers and call center agents whom are trained to handle call center interactions. Such information, if it is present at all, is in a separate set of reports and not linked to the core set of call center reports. The call center administrator thus lacks a comprehensive view the activity in the center.

Another limitation in call center technology is the lack of useable interaction analytics that can be provided to agents and supervisors in real time to help them optimize the interaction experience of the customer and agent. Current call center systems do not provide speech analytic information to the agent or supervising personnel for example, but are limited to more static screen pop information that is either furnished by the caller at the start of the call or retrieved from a database during the interaction between a caller and an agent. Existing systems cannot advise the agent based on information gathered and analyzed about the current conversation.

Therefore, what is clearly needed is system and methods for capturing and analyzing current interaction activity including speech and text interaction such that the outcome of analysis can be made part of the historical record of the call center and be made available to managers, supervisors, agents and systems in such a way as to enable corrective intervention to occur during the interaction process.

SUMMARY OF THE INVENTION

A problem stated above is that it is desired in a call center environment to be able to manipulate the outcome of an interaction in progress using intelligence developed during the progress of the interaction. However, current means for acquiring the intelligence needed to determine how best to handle the interaction is limited to tapping into information already known about the caller or to information provided by the caller before or during the interaction as a result of some prompting made to the caller.

While real-time behavioral analysis of the interaction process is practiced in some systems to help predict when an upsell should be offered or when an invitation to a live interaction should be provided to a customer engaged in a non-live interaction with a system or a Web site, these systems known to the inventors fall short of the ability to provide a whole analysis of the current behavioral state of the caller with respect to emotional state and topical interest of the caller that might be exhibited only during the interaction in progress with the caller or party to a non-live or live interaction.

Moreover, in known systems where some intelligence is provided by analyzing browsing behavior, typed text, or voice inflection or tone, the intelligence is not developed in a sufficient timeframe to be used to manipulate the outcome of that interaction at the time of the interaction or requires human intervention to determine if a manipulation is required and what action should be pursued.

The inventor therefore searched the art of call center data reporting systems, speech recognition systems, and interaction routing systems looking for elements that exhibited a propensity for integration in an automated environment. Every call in center is driven by the success of agents and automated systems relative the process of engaging and retaining customers to produce higher numbers of sales and more profitable sales. One byproduct of this activity is the existence a number of customers who have negative experiences, failed to complete transactions, or otherwise are dissatisfied with tier experiences during the interaction process.

The inventors realized during an intuitive moment that if during the interactive experience, a more complete analysis of call center customer preferences and emotional state could be performed and if such intelligence gleaned could be automatically leveraged to determine appropriate actions that could influence the outcome of such interactions in a positive way through a semi-automated or wholly automated process, then higher numbers of sales and more profitable sales would result.

The inventors therefore constructed a unique system for monitoring and analyzing interactions that enabled automated development of a more complete salvo of intelligence used, in some cases in automated fashion to effect an influence in the outcome of some interactions in real time that otherwise would suffer some negative result.

Accordingly, in an embodiment of the present invention, a computerized system for advising one communicant in electronic communication between two or more communicants is provided, comprising apparatus monitoring and recording interaction between the communicants, software executing from a machine-readable medium and providing analytics, the software including rendering speech into text, and analyzing the rendered text for topics, performing communicant verification, and detecting changes in communicant emotion. Advice is offered to the one communicant during the interaction, based on results of the analytics.

In one embodiment the electronic communication is voice communication and occurs over a telephony network integrated with a computer network and wherein the two or more communicants include a call center agent and a call center customer or customers. Also in one embodiment the electronic communication is a voice communication and the speech interaction is analyzed for speaker verification, and emotional state of one or more communicants. In another embodiment the electronic communication is a text communication and the text interaction is analyzed for communicant verification and emotional state of one or more communicants.

In one embodiment the system performs emotion detection by phrase interpretation, character state interpretation and, or by emotion icon recognition. Also in one embodiment the apparatus provides call control and media processing. Further in one embodiment the advice offered is a pre-defined upsell script based on prevailing topic of the communication, the script served to one of the communicants in real time.

In one embodiment the pre-defined script is selected from a pool of pre-defined scripts and served to a GUI operated by the communicant, the communicant a call center agent. Call control may be performed by a session initiation protocol (SIP) server. Also the media session markup language (MSML) may be used to control the voice platform supporting the voice communication. Further the media resource control protocol (MRCP) may be used to control the software analytics. In some cases the analytics for topic recognition may include configurable modes for hot word recognition and for continuous speech recognition.

In another aspect of the invention a method for advising one communicant in electronic communication between two or more communicants is provided, the method comprising the steps of (a) monitoring and recording electronic communication between the communicants; (b) executing software from a machine-readable medium, providing analytics including rendering speech into text, analyzing the rendered text for topics, performing speaker verification, and detecting changes in speaker emotion; and (c) offering advice to the one communicant during the interaction, based on results of the analytics.

In one embodiment of this method in step (a) the electronic communication is voice communication and occurs over a telephony network integrated with a computer network and wherein the two or more communicants include a call center agent and a call center customer or customers. Also in one embodiment in step (a) the electronic communication is a voice communication and in step (b) the speech interaction is analyzed for speaker verification, prevailing topics, and emotional state of one or more communicants.

In some embodiments the electronic communication is a text communication and the text interaction is analyzed for communicant verification, prevailing topics, and emotional state of one or more communicants. Also in some embodiments the emotional state of the one or more communicants may be achieved by phrase interpretation, character state interpretation and, or by emotion icon recognition. In some cases in step (c) the advice offered is a pre-defined upsell script based on prevailing topic of the communication, the script served to one of the communicants in real time. In still other cases the pre-defined script is selected from a pool of pre-defined scripts and served to a GUI operated by the communicant, the communicant a call center agent.

BRIEF DESCRIPTION OF THE DRAWING FIGURES

DETAILED DESCRIPTION

The inventors provide a system for monitoring and analyzing an interaction and for reporting the results of analysis of the interaction. The system incorporates one or more interaction analysis engines enabling continuous voice and text recognition with topic detection, speaker verification, and emotion detection. The system of the present invention is described in enabling detail using the following examples, which may represent more than one embodiment of the invention.

Figure 1:
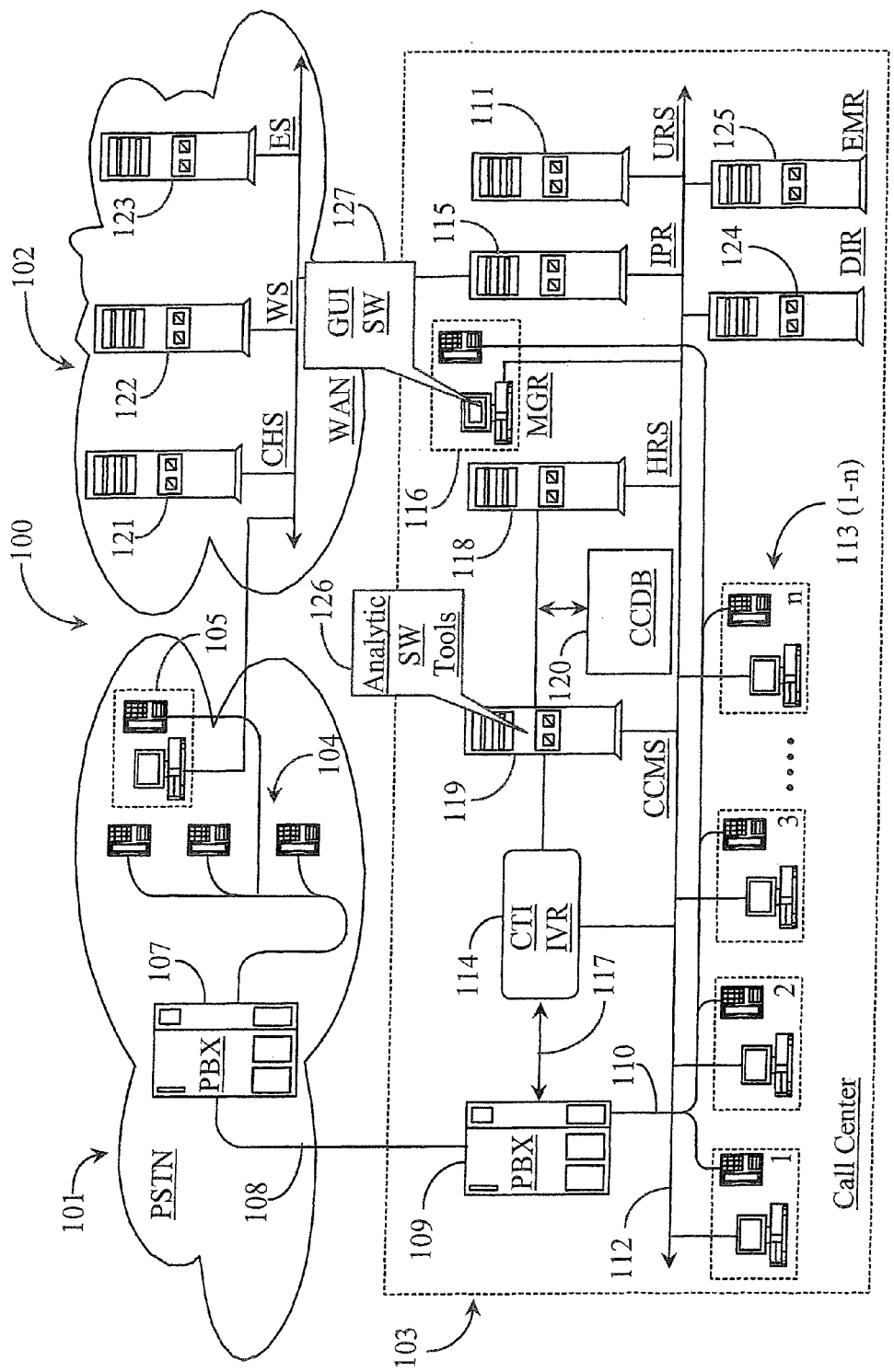
FIG. 1 is an architectural overview of a call center practicing real time interaction analysis and real time reporting of results according to an embodiment of the present invention.

FIG. 1 is an architectural overview of a call center 103 practicing real time interaction analysis and real time reporting of results according to an embodiment of the present invention. A communications network is illustrated in this example and includes call center 103, a public switched telephone network (PSTN) 101, and a wide area network (WAN) 102.

WAN 102 may be a corporate or private WAN including but not limiting to the Internet network. In this example WAN 102 is an Internet network and may be referred to hereinafter in this specification as Internet 102. PSTN 101 may include wireless carriers and other telephony networks connected thereto by bridging and is meant to encompass any telephone network including digital and analog networks. The inventor chooses the Internet and PSTN as accessible networks to call center 103 because of the high public access characteristics of those networks.

Call center 103 is dual capable meaning that it may receive interactions from PSTN 101 and from Internet 102. Call center 102 has a local area network (LAN) 112 provided therein and adapted for transfer control protocol over Internet protocol (TCP/IP) among other known Internet protocols, not mentioned here but generally known to the skilled artisan. LAN 112 supports various personnel workstations as well as a host of nodes adapted to facilitate practice of the present invention. LAN 112 supports a plurality of agent workstations illustrated herein as agent workstations 113 (1-$n$). In this example, each agent workstation 113 (1-$n$) includes a LAN-connected personal computer (PC) and a telephone. Agents operating at stations 113 (1-n) are required to log into the call center system and may be located by the system using a directory server such as a directory server (DIR) 124 connected to LAN 112.

LAN 112 supports at least one manager or supervisor workstation (MGR) 116. Workstation 116 also includes a LAN-connected PC and a telephone connected to PBX 109 by internal telephone wiring 110. Other equipment may be included within a workstation of an agent or manager without departing from the spirit and scope of the present invention. The inventor deems that illustration of a LAN-connected PC and associated telephone is sufficient for explaining the various aspects of the present invention.

In this example call center 103 has a centralized telephone switch 109 through which calls are received at the call center and placed from the call center (outbound). Switch 109 may be any type of call center switch including an automatic call distributor (ACD), a soft switch (implemented in software), or a private branch exchange (PBX). Switch 109 is a PBX in this example. Switch 109 in call center 103 has connection to a local network switch 107 by way of a telephone trunk 108. In this example the local network switch is also a PBX switch. Callers placing telephone calls into call center 103 or receiving telephone calls from call center 103 are illustrated herein as telephone icons 104 each telephone icon representing a potential customer of call center 103.

A customer station 105 is illustrated within PSTN 101 in this example. Customer station 105 has a telephone analogous to telephones 104 connected to local switch 107 via network telephone wiring. In one embodiment cellular telephones including smart telephones are used in place of landline telephones. Customer station 105 includes a personal computer illustrated herein as connected to the Internet network directly or through an Internet service provider (ISP not illustrated). Other more direct methods of Internet access are known in the art including digital subscriber line (DSL) technology, integrated digital services network (ISDN), broadband, wireless fidelity (WiFi), cable modem, etc.

All calls arriving at switch 109 in call center 103 are ultimately handled by the call center through live assistance from an agent or through the assistance of some automated system. PBX 109 is enhanced in this example by a computer telephony integrated (CTI) processor 114, also supporting an instance of interactive voice response (IVR) unit. Processor 114 is connected to switch 109 by a CTI link 117. Voice calls from Internet 102 and from sub-telephony networks connected to PSTN 101 may all arrive at switch 109 as incoming telephone voice calls. Agent telephones illustrated in agent stations 113 (1-n) are all connected by internal telephony wiring to PBX 109.

LAN 112 supports an Internet protocol router (IPR) 115 within call center 103. IPR 115 is adapted to provide direct Internet access to LAN 112 in a continuous manner such as on a 24/7 basis. IPR 115 enables bi-directional data and communication flow between call center agents and systems and resources including customers connected to the Internet network. IPR 115 has connection to Internet 102, more particularly to an Internet backbone illustrated herein as a double arrow extending through cloud 103. The illustrated backbone logically represents all of the lines, equipment and access points that make up the Internet as a whole. Therefore there are no geographic limitations to the practice of the present invention.

A chat server (CHS) 121 is illustrated within the domain of Internet 102. CHS 121 has a digital medium accessible thereto for storing and serving data and for storing and executing applications enabling server function. CHS 121 is adapted to enable live chat sessions between agents from call center 103 and any potential customers having access to the network using a computing appliance capable of network navigation. One with skill in the art will recognize that a computing appliance capable of accessing Internet 102 may include but is not limited to a desktop computer, a laptop computer, a personal digital assistant or a smart cellular telephone.

A Web server (WS) 122 is illustrated within the domain of Internet 102. WS 122 has a digital medium accessible thereto for storing and serving data and for storing and executing applications enabling server function. Web server 122 is an electronic information server adapted to serve Web pages in hypertext transfer markup language (HTML) or another presentation protocol such as wireless application protocol (WAP). WS 122 may host one or more Web sites of one or more companies represented by call center 103. WS 122 may be though of as a customer access point to call center 122. One or more call center applications may be implemented in Web services description language (WDSL) or other known application protocols generally known to the skilled artisan including the inventors. A Web page served by WS 122 to any potential customer may include various options for making contact to call center 103 including voice-based, and text-based interaction through call buttons, chat options, and messaging options.

Internet 102 has an email server (ES) 123 illustrated therein. ES 123 has a digital medium accessible thereto for storing and serving data and for storing and executing applications enabling server function. ES 123 is adapted to serve email to agents operating at agent workstations 113 (1-n) through IPR router 115. In one embodiment LAN 112 supports a general email router (EMR) 125. EMR 125 is a special email routing service for determining final internal routing to agents (over LAN 112) for emails sent to a generalized email address for the call center.

A universal routing server (URS) 111 is illustrated within call center 103 and connected to LAN 112. URS 111 has a digital medium accessible thereto for storing and serving data and for storing and executing applications enabling server function. URS 111 is adapted to serve internal routing strategies to requesting nodes over LAN 112. Initial routing strategy is typically invoked through a caller pre-screening process conducted using the IVR running on CTI processor 114. URS 111 may also be used to determine routing strategy in the case of a redirect or subsequent routing requirement as a result of interaction processing.

Voice calls registered at switch 109 may be intercepted by the IVR running on CTI processor 114 to determine the purpose of the call for the benefit of selecting an internal routing destination for the call. The present invention includes a method for monitoring those calls that are routed to a live agent for the purpose of ensuring quality of the interaction and for gleaning information from the interaction in real time whereby that information is used in one or more analysis routines to provide additional data for historical reporting in one embodiment.

In one embodiment of the present invention, a historical reporting server (HRS) 118 is provided within call center 103 and connected to LAN 112. HRS 118 has a digital medium accessible thereto for storing and serving data and for storing and executing applications enabling server function. HRS 118 is adapted to record all call center activity and serving the information upon request in the form of specialized reports ordered from an interface such as a graphical user interface software (GUI SW) 127 illustrated on the computer of MGR station 116. As was described further above in the background section of this specification, historical reporting at the time of filing this application is limited to mechanical call data such as average handling time (AHT), results of the call, and any caller information that was already known to the system or that was obtained in caller pre-processing. Information concerning the caller's mood, and topics of preference that arise during the course of the interaction and validity of the caller's identity are not available in standard reports.

A call control media server (CCMS) 119 is provided within call center 103 and connected to LAN 112. CCMS 119 has a digital medium accessible thereto for storing and serving data and for storing and executing applications enabling server function. CCMS is integration between a call control server and a media-processing server. CCMS 119 is adapted to set up and tear down the call legs of a call and the media processor is adapted to process any associated media such as voice, video, and other media applications. In this example, HRS 118 and CCMS 119 are connected together via a separate digital network. CCMS is also connected directly to CTI processor 114 via the separate data network. A call center database (CCDB) 120 is provided and is made accessible to CCMS 119 and to HRS 118. Monitoring occurs within CCMS of all of the interactions represented therein. In one embodiment, CCMS records all data to CCDB 120 and HRS 118 serves all requested data from CCDB 120.

CCMS has at least one analytic tool 126 implemented in software (SW) that is executed at server 119 during interactions in process. Analytic tools enable performance analysis of an interaction from the perspective of the caller, the agent, or both caller and agent. In one embodiment a speech recognition system with a topic detection feature is used to determine what topics customers are talking about or are interested in based on the call transcripts. The ASR (not illustrated here) may have more than one mode of operating relative to topic detection. In one mode, the ASR system is set to recognize any hot words that are spoken by the caller. In another embodiment entire conversations are recorded and analyzed for topic detection. A version of the topic detection feature may be adapted for processing text-based interactions as well. In continuous recognition mode, the ASR recognizes the entire conversation and can generate a list of topic preferences that were prominent during the conversation.

In one embodiment the system further includes an emotion detection system for determining if a caller or an agent or both is angry, disappointed, frustrated, etc. The emotion detection system (not illustrated here) may work by analyzing voice inflection, tone, volume, etc. A version of the emotion detection system may be used to analyze text message where emotion icons are used and where other emotion bearing indications are present like use of all caps in a message or other signs of mood used in a text message.

In one embodiment of the present invention all of the information detected during an interaction whether the interaction is voice-based or text-based is stored with all of the traditional historical information related to the interaction and interaction initiator (customer). A manager operating GUI SW 127 from MGR station 116 can order and receive specialized historical reports that exhibit what topics the customers are talking about. The manager or supervisor can get a good indication of the levels of frustration of callers over a period of time. The information may be presented in any number of customized reports that can include information about just a single interaction to statistics relative to some of or all of the interactions that occurred and were monitored by CCMS 119.

Calls received at PBX 109 for internal routing are setup by CCMS 119 in this example after CTI notification of calls pending. CCMS may utilize IVR records of the calls to determine with the aid of URS 111 the best routing strategies for the calls being set up in the system. URS returns the routing strategy for each call based on information sent to it in the request from CCMS 119, which includes IVR records of the pre-screening process. URS 111 may also subscribe to call center statistics on agent availability, estimated wait time (EWT) in queue, and other states before returning a viable routing strategy for each call pending. Manual routing and redirection may also be practiced by agents and supervisors logged into the system in place of or in addition to URS participation.

In one embodiment the information gathered during the interactions is used to supplement historical reporting of call center activity adding new dimensions to what can be learned about the activity. In another embodiment the information gathered during the course of interaction is utilized in real time to optimize the interactive experience of the customer by providing solutions that overcome perceived states of the caller concerning mood and topical preferences. In this embodiment the invention is further characterized by provision of a real-time scripting service that may be used to send pre-defined scripts to agents engaged in a live interaction the scripts relative to information gathered during the course of the interaction.

Figure 2:
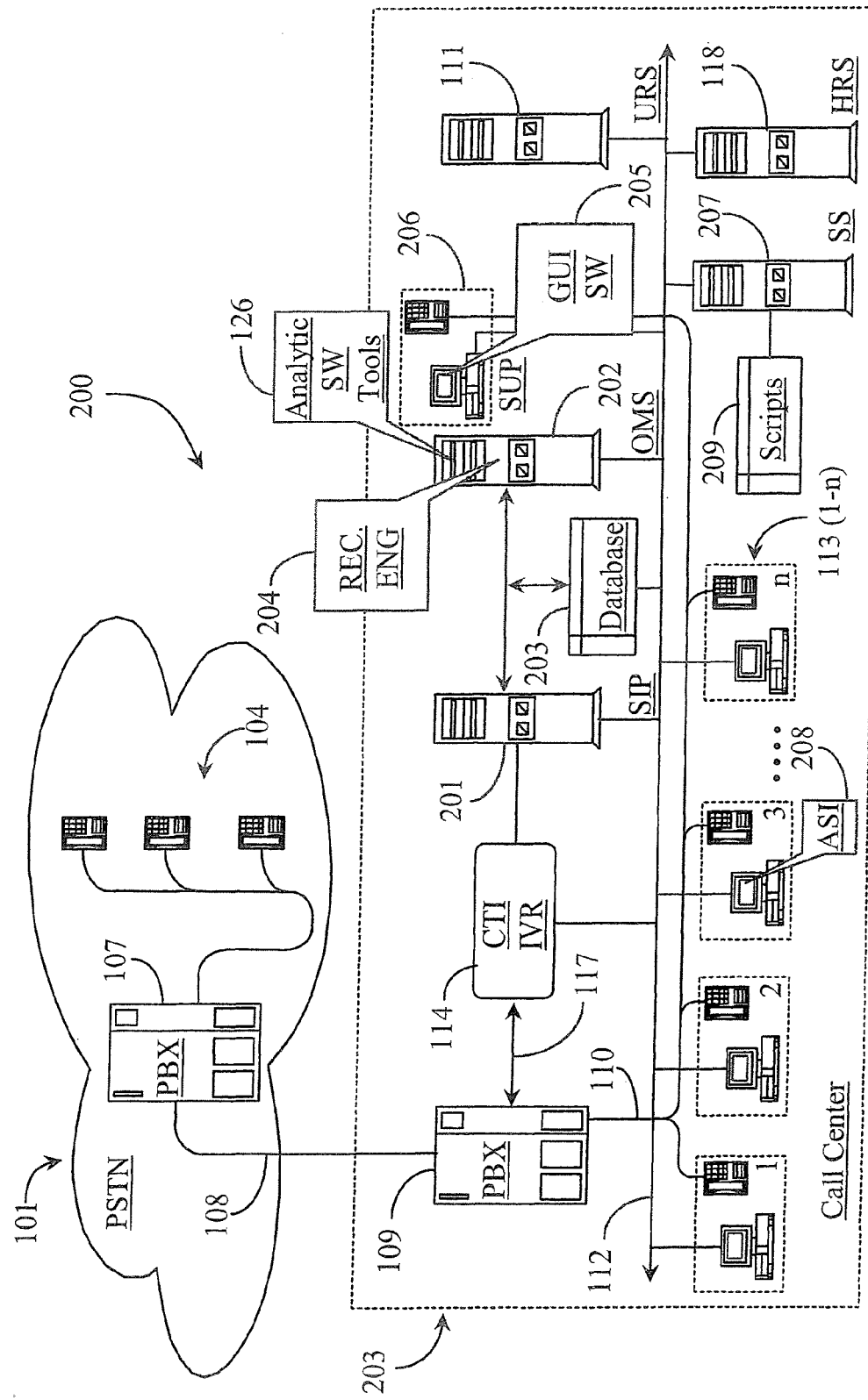
FIG. 2 is an architectural overview of a call center practicing caller voice analysis and script service according to an embodiment of the present invention.

FIG. 2 is an architectural overview of a call center 203 practicing caller voice analysis and script service according to an embodiment of the present invention. A communications network 200 includes call center 203 and PSTN 101. Internet access for call center 203 is not illustrated in this example but may be assumed present. In this example, the focus is about agent scripting as a result of analysis of information gathered during the course of live voice interactions wherein the scripts are delivered to the agents in time to influence the outcome of those interactions.

Callers 104 represent customers of call center 203, in this example. The callers access center 203 through local PBX 107 over trunk 108 and register at PBX 109 for internal routing. IVR treatment is not precluded in this example. All callers may first be treated via IVR before determining a final destination for each caller. In this example a call control server is provided separately from a media server. A session initiation protocol (SIP) server 201 is provided within call center 203 and connected to LAN 112. SIP server 201 serves as the call control server in this example. SIP server 201 has a digital medium accessible thereto for storing and serving data and for storing and executing applications enabling server function. SIP server 201 uses SIP to set up and tear down all voice calls in this example. Other standard protocols used to set up and break down voice calls may be used in place of SIP such as Call Control extensible markup language (CCXML) for example.

SIP server 201 has a separate digital network connection to an open media server (OMS) 202. OMS 202 has a digital medium accessible thereto for storing and serving data and for storing and executing applications enabling server function. OMS 202 is adapted to perform the media processing part of the interactions set up between live agents and customers of the call center. In this example OMS 202 may be called by SIP server 201 on an as needed basis.

OMS 202 includes a recording (REC) engine for recording voice interactions monitored in SIP 201. Analytic SW tools 126 for determining topic preferences and moods or emotions exhibited by callers and perhaps agents as well are provided on OMS 202 instead of in an integrated call control/media server analogous to CCMS 119 of FIG. 1. A data repository labeled database 203 is provided as a centrally located and shared database for SIP server 201, OMS server 202, and HRS server 118.

A supervisor station 206 is illustrated in this example and may be analogous somewhat, at least in physical implementation, as MGR station 116 described with reference to FIG. 1. Supervisor station 206 has a GUI SW 205 provided thereon and executable there from. GUI SW 205 includes at least one enhancement over GUI SW 127, which is the capability of allowing the supervisor to engineer agent scripts off line and to use current information about a call in progress to send particular scripts to the agent to read to the customer during the course of the interaction.

In one embodiment a script server (SS) 207 is provided within call center 203 and connected to LAN 112. SS 207 has a digital medium accessible thereto for storing and serving data and for storing and executing applications enabling server function. SS 207 is adapted to send designated predefined scripts to selected agents whom are in progress with a call that the script is intended to influence the outcome of. A data repository 209 labeled scripts is provided and connected to SS 207 by data link. Repository 209 is adapted to store all of the relevant scripts that can be selected and served to agents working calls. In one embodiment a supervisor or other authorized individual such as a supervisor operating station 206 has a hand in causing a script to be selected from repository 209 and served to an agent. In another embodiment scripting service is entirely automatic with the scripts being selected by a software program after analyzing results of a voice call in progress.

An agent script interface (ASI) 208 is provided as a graphical user interface on each agent station such as agent station 113 (3) as illustrated in this example. Every participating agent working the live calls may be assumed to have an open instance of ASI 208 running on the display screen of their LAN-connected computers. ASI 208 is adapted to receive and display scripts sent from SS 207. ASI 208 is not absolutely required in order to practice the present invention. A script can be engineered to execute and display on its own as an alert script that appears in a window. ASI 208 provides a more convenient and efficient way to display scripts and the scripts that are displayed may be saved and recorded along with the interaction data in the historical record of call center activity.

To illustrate an example, consider a caller registered at switch 109. The routing determination to route the call to agent 113 (3) is made after IVR pre-screening. Agent 113 (3) picks up the call and begins servicing the caller. In the meantime recording engine 204 is recording both the agent and the caller. An ASR system is turned on with topic detection and hot word recognition. An emotion detection system is turned on for the caller's voice but not for the agent's voice. During the course of the call the detection tools determine that the hot word trade was recognized and the prevailing topic is upgrading to a new system with the trade. Also during the course of the call the caller's mood or emotional state is determined to be excited or very positive.

The original call may have been a service call for an existing system the caller has but with the newly detected information, a monitoring supervisor operating at supervisor station 206 aided by GUI 205 has determined that a scripting service is appropriate for the current situation with the immediate interaction being evaluated. The supervisor may highlight the caller and select an action such as "send scripting to agent of this call". The information gathered during the call is used along with one or more rules to determine which script to send from a pool of scripts. The decision to select and send a specific script to a particular agent involved in a call is made automatically once the supervisor invokes the service on behalf of a call in progress.

SS 207 selects the correct script based on information in hand and rules governing which script to send based on that information. In this case SS 207 selects a script from scripts database 209 and serves it to ASI 208 open on the PC display screen. The script may appear with a system prompt urging the agent to read the script to the customer. In this use case the script may be an offer to "upgrade" to the next best system and to accept the "trade" offered by the customer. In this case emotion detection determined that the caller was excited reinforcing the idea of intervening with an up-sell script. In this embodiment all of the activity including the caller and agent voice recordings, transcripts, and the topic prevalence, and the emotional state of the caller and/or agent is recorded in the historical record of activity at the call center and is subject to inclusion in one or more custom reports ordered by a manger or supervisor.

In this embodiment scripting may be ordered for any agent that is currently involved in a current interaction. Selection of scripts is dependant in part on what emotional state exists with the caller and what topics are prevailing in the conversation. In one embodiment the same topic and emotion detection schemes can be used to influence a live chat or an instant message session. In one embodiment Web visitors can be offered services base on analysis of the Web behavior that can be linked to topic prevalence or to an emotional state. For example, a topic can be detected based on the visitor's page preference or click-history at the Web site. The emotional state of the visitor might be deduced by observing the navigation behavior, for example going back and forth repeated on the same sequence of Web pages could indicate frustration.

Figure 3:
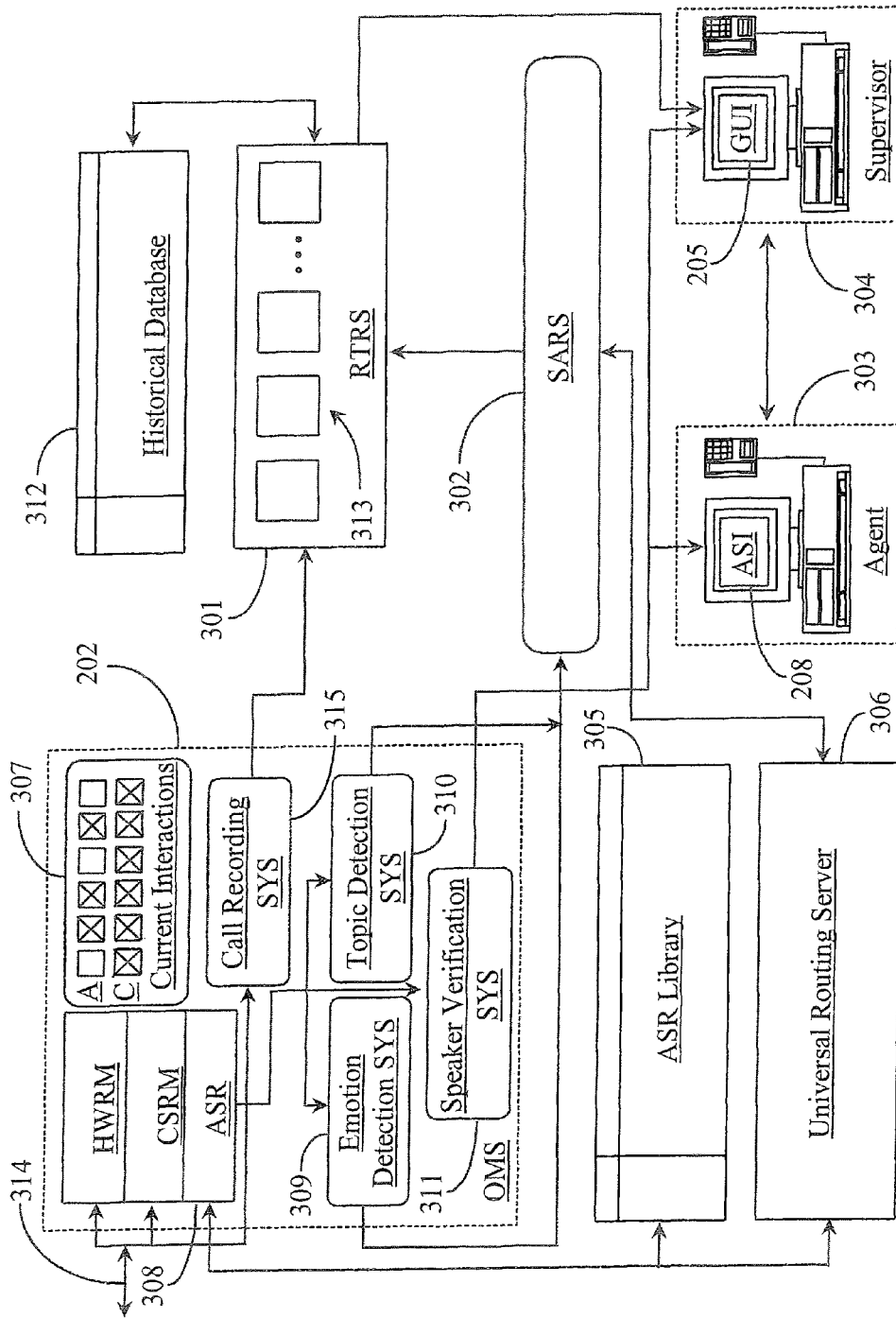
FIG. 3 is a block diagram illustrating basic components of a speech analysis and real time reporting system according to an embodiment of the present invention.

FIG. 3 is a block diagram illustrating basic components of a speech analysis and real time reporting system according to an embodiment of the present invention. Open Media Server (OMS) 202 from FIG. 2 is illustrated in this example in more detail. Components of analytic tools 126 of FIGS. 1 and 2 are in one embodiment hosted on OMS 202. In another embodiment they may be hosted within the call control server such as SIP server 201 described in FIG. 2.

An automated speech recognition (ASR) system 308 is provided in this example and has two separate modes of speech recognition. ASR system 308 has a hot word recognition mode (HWRM) and a continuous speech recognition mode (CSRM). ASR system 308 has a connection to an ASR library repository 305 adapted to store vocabulary and other data required to enable ASR function. In this embodiment ASR system runs on OMS 202, which is connected by a data link 314 to a monitoring CTI processor and therefore has access to the live voices of the agent and the customer of any particular call being monitored.

Output from ASR system 308 may be recorded by a call recording system illustrated herein as a call recording system 315. Output from ASR system 308 may be processed for topic detection by a topic detection system (SYS) 310. Topic detection system 310 may be turned on or off in a pre-configuration process. With topic detection turned on, the system attempt to determine if one or more high priority topics are prevalent in the conversation between an agent and a customer of a voice call. Topic detection system 310 may parse transcripts of the conversation to detect topics that are primary in the conversation.

Output from ASR system 308 may be processed for emotion detection by an emotion detection system (SYS) illustrated herein as an emotion detection system 309. Emotion detection system may work in conjunction with speech recognition to detect if any prevalent emotional states can be detected in either the customer's voice patterns or in the agent's voice patterns, or both. Emotional detection system 309 may analyze voice inflection, tone, volume, pattern and other voice characteristics to determine if any significant emotional state can be implied to the customer, to the agent, or to both the customer and the agent during a conversation. Emotional detection SYS 309 may be turned on or off during a pre-configuration process.

Output from ASR system 308 may be processed by a speaker verification system 311. Speaker verification system may detect if there are delays or inconsistent answers to specific questions typically asked of callers to verify that the caller is who they say they are. If a caller delays or fails to answer one or more of these types of security questions, the speaker verification system may generate an alert and send the alert to the agent and/or supervisor to alert them of a possibility of fraud. Speaker verification system 311 can be turned on or off during a pre-configuration process. In one embodiment speaker verification system 311 has access to a repository containing speaker verification data such as answers to security questions that are kept on file. In one embodiment speaker verification system 311 may also have access to a third party validation system that may provide some validation service for callers. In one embodiment voice patterns of repeat callers are recorded and saved. In this embodiment the speaker verification system may compare a callers voice against a sample of the caller's voice kept on file for the purpose.

In one embodiment ASR system 308 is capable of receiving and delivering routing instructions to an agent engaged in a conversation in a case where some analysis of a customer's speech warrants additional routing to another party, for example, to diffuse a crisis or to help pacify a disgruntled customer. In this case ASR system 308 may have connection to a universal routing server (URS) 306. URS 306 is analogous to URS 111 described further above with reference to FIG. 1.

In this example, OMS 202 includes an interaction queue 307 that is adapted to represent current interactions being processed by the system of the invention including an indication of which parties to each conversation are being analyzed by one or more of the analytic processes. In a visual representation of queue 307 each conversation has two parties listed, an agent (row labeled A) and a customer (row labeled C). Reading from left to right, a first interaction represented in queue indicates that the customer will be analyzed but the agent will not. The second and third conversation queued indicate that both parties to the conversations will be analyzed. The pattern follows for every column representing a two party conversation. In one embodiment the queue representation may be extended for three party calls and conference calls where some of the participants may be analyzed and some may not.

The granularity of configuration for agents may come down to each agent for configuring if and what analysis routines will be performed on that agent's voice when in conversation with a customer. In most embodiments all customers calling in have their speech processed for emotion and topic prevalence. However, customers may be configured individually as well. For example, a rule could be created for John Doe to always analyze his voice for emotional state when he calls in. It may be a fact that John is easily upset and often expresses disappointment or anger even though he may be a great customer. In one embodiment queue 307 contains current interactions in progress where an agent and a customer are actively engaged. In another embodiment queue 307 contains interactions that are still pending but where the agent that will take the call has already been selected by the routing server.

Output from call recording SYS 315 is sent to a real time reporting server (RTRS) 301. RTRS 301 has a digital medium accessible thereto for storing and serving data and for storing and executing applications enabling server function. RTRS 301 is analogous to HRS 118 described previously with reference to FIG. 1. RTRS is connected to historical database 112 introduced and described previously with reference to FIG. 1. All recordings made of conversations are saved as well as transcripts of the conversations and other media processed with those conversations.

In one embodiment where it is desired to influence the outcome of a conversation, output from emotion detection system 309 and from topic detection system 310 is input into a speech analysis recommendation engine (SARS) 302. SARS 302 is adapted to take the results of emotion detection system 309 and the results of topic detection system 310 and process those results using one or more algorithms to determine an appropriate course of action given the results of speech analysis. SARS 302 has a digital medium accessible thereto for storing and serving data and for storing and executing applications enabling server function.

SARS 302 may be connected to a rules base (not illustrated) containing rules pertinent to what courses of action should be taken based on what input parameters. One course of action is a rerouting of the caller to a new destination. Another course of action is serving a notice to agents containing suggested scripting for the agent to read to the customer. Any negative indication found through agent voice processing may result in a disciplinary recommendation, a temporary re-assignment, a simple warning, or a request to attend a specific training session, or the like. SARS is, in one embodiment connected directly to RTRS 301 via a data link. In this case SARS 302 sends its output to RTRS 301 for historical data storage and for real time reporting.

In one embodiment SARS 302 may have a LAN connection for the purpose of communication directly with agent stations and supervisor stations. However in this embodiment SARS 302 only reports to RTRS 301. RTRS 301 is adapted to server data relative to current conversations to GUI 205 running in this example on the computer of a supervisor workstation 304. It is noted herein that voice analysis data and recommendation data may also be made part of the historical record of call center activity.

Data served from RTRS 301 to GUI 205 for display may be packaged in the form of one or more custom reports 313. In one embodiment a supervisor subscribes to RTRS 301 and may pre-configure rules relative to what solutions may be recommended by SARS 302. The supervisor may also pre-configure the types of reports that are desired and for who in the group including customers and agents engaged in conversation the reports will be about. For example, a supervisor may order a report that reveals a real time percentage of the total number of current customers engaged in monitored conversation that have had a negative emotions rating during their conversation.

In one embodiment of the invention, a supervisor working at supervisor station 304 may select and serve scripts to agents based on real time information about their current conversations with customers. Agent workstation 303 includes agent-scripting interface (ASI) 208 and is adapted to receive scripting sent by a system or by a supervisor or manager. RTRS 301 may send a report to the supervisor of workstation 304, the report displaying in GUI 205. The report may alert the supervisor to favorable topical preferences in some of the current conversations in progress. The report may include a list of one or more than one recommended script (recommended by SARS 302). When SRARS 302 makes a recommendation, that recommendation is almost immediately available to a supervising entity through push alert or through receipt of a custom report that contains the recommendation. In one embodiment GUI 205 includes a real time activity panel that when displayed lists all of the current interactions being monitored, identifies the parties to those interactions, and displays any real time analytic results fleshed out during those interactions such as current emotional states and topic prevalence states.

Figure 4:
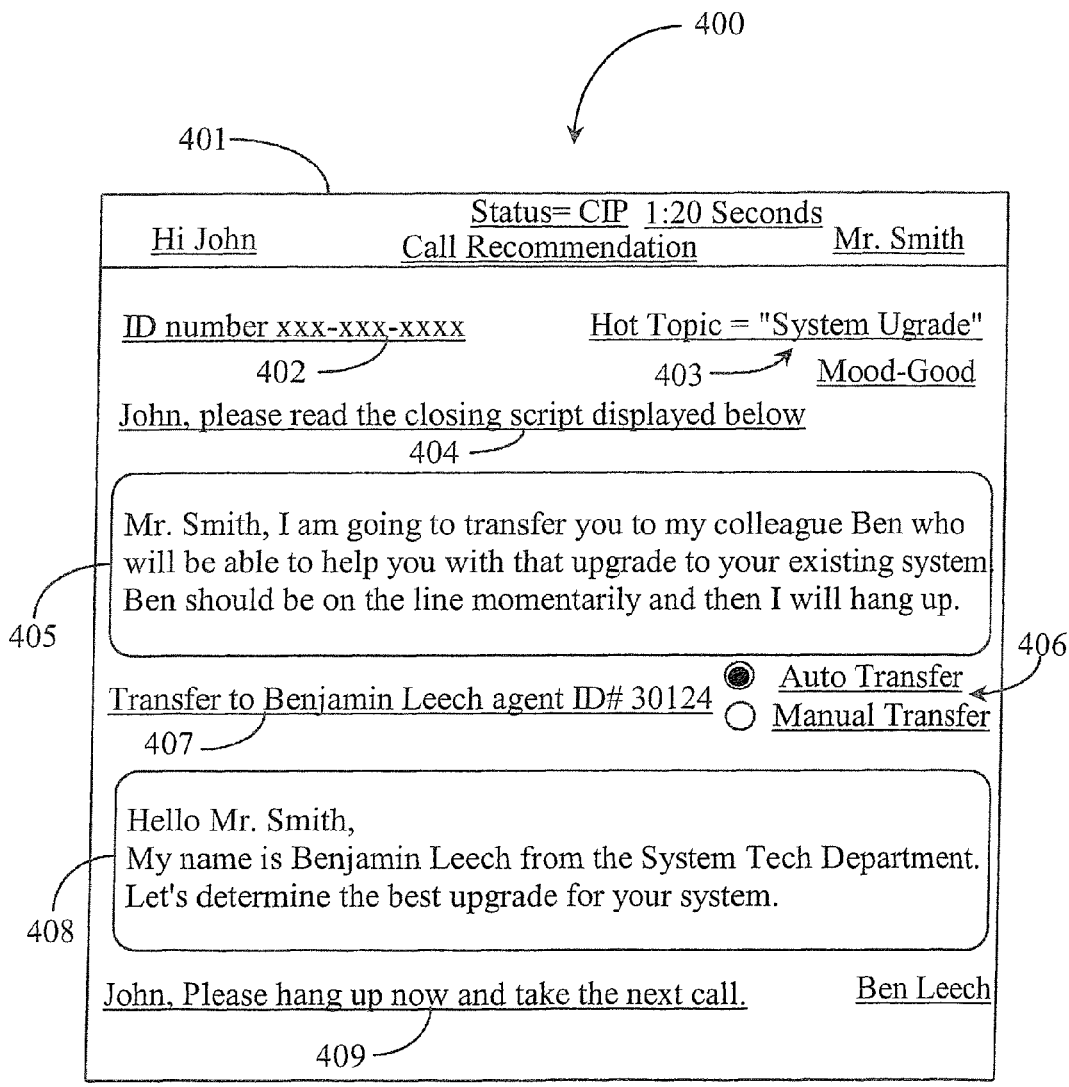
FIG. 4 is an exemplary screen shot of an agent scripting interface according to an embodiment of the present invention.

FIG. 4 is an exemplary screen shot 400 included in an agent-scripting interface according to an embodiment of the present invention. Screen shot 400 represents a system recommendation that includes scripting service to an agent that is currently interacting with a customer. Screen shot 400 includes a title bar 401 that identifies the screen as a call recommendation. Screen shot 400 may be referred to hereinafter as a call recommendation screen 400. Title bar 401 of call recommendation screen 400 is personalized to a call center agent John who is the recipient of the recommendation. Bar 401 identifies the caller currently in interaction with agent John as Mr. Smith. The title bar also indicates the time in for the current interaction, in this case 1: 20 seconds meaning that John has been on the telephone with Mr. Smith for one minute and 20 seconds. The time status feature on the title bar increments accordingly as the call progresses. A link between the ASI and the call control server enables the stopwatch feature for every conversation.

In one embodiment a caller identification number 402 is displayed in the call recommendation, which could be the Mr. Smith's telephone number. Real time analytic results 403 may be displayed in the call recommendation screen. In this case a hot topic or hot word is "System Upgrade". Therefore, the customer has mentioned or asked about a system upgrade either directly or casually during the interaction. The call recommendation screen may include a prompt 404 intended for John. Prompt 404 simply asks John to read the closing script 405. The system has already determined that the call will be routed to another more-experienced agent so John must end the conversation until a new agent picks up the call. In one embodiment the script displays for reading and becomes part of the interaction history between John and the customer Mr. Smith. The script simply informs Mr. Smith that he will be routed to another agent Ben that will help him with upgrading his current system. Agent John will likely hold to make sure that the other agent is in place to accept the call.

A system prompt or command 407 is displayed beneath closing script 405 to transfer the caller to Ben Leech ID #30124. The system has already determined that Ben Leech is the best possible match for the caller at the current time. Call recommendation 400 includes transfer options 406 of automatic transfer (system performed) or manual transfer (agent task). While agent John is still on the telephone with Mr. Smith with the transfer in progress, Ben Leech picks up the call and reads an introductory script 408 sent to his ASI and to the ASI of John.

In one embodiment script 408 is not a pre-defined script and may be an actual text rendition of what Ben says when he picks up the telephone with John and Mr. Smith on the line. After the greeting from Ben, a system prompt 409 appears on call recommendation 400 asking John to please hang up the telephone and take the next call. A script server may serve call recommendation 400, or it may be served by a speech analysis recommendation system (SARS) analogous to SARS 302 of FIG. 3, or by a supervisor operating a supervisor station like station 304 of FIG. 3. In another embodiment the script appears in the call recommendation window, which is generic to the agent-scripting interface. In this case both scripts and system prompts may appear as required in the interface using the screen as a template the data appearing in the appropriate fields.

Figure 5:
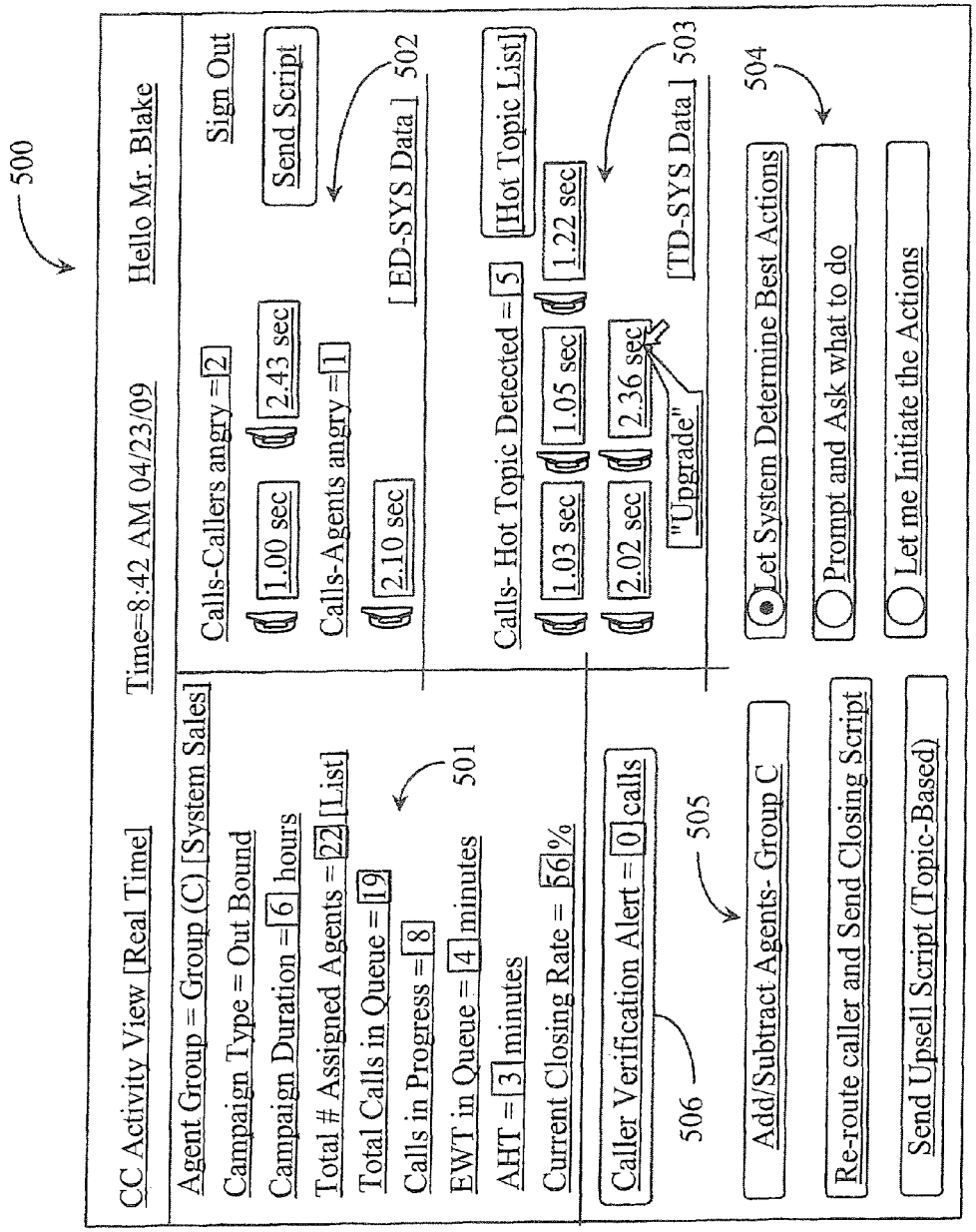
FIG. 5 is an exemplary screen shot of a graphical user interface for viewing call center activity in real time according to an embodiment of the present invention.

FIG. 5 is an exemplary screen shot 500 of a graphical user interface for viewing call center activity in real time according to an embodiment of the present invention. Screen shot 500 represents a current call center activity view or report that may be ordered by or pushed to a supervisor in charge of a particular group of agents. This view may be served to the supervisor GUI analogous to GUI 205 described previously. View 500 has a title bar that includes the title CC Activity View [Real Time]. The title bar also has the current time and date. The view is personalized to a Mr. Blake, which is the recipient of the view.

View 500 may include a window dedicated to the display of group statistics 501 as they are at view time. In this case Mr. Blake is a supervisor in charge of a campaign utilizing a specific group of call center agents. Reading from top down the data reveals an Agent Group assigned to and scheduled to work the campaign. The Agent Group=Group (C) [System Sales]. In this case the type of campaign is an outbound calling campaign. The campaign duration=6 hours. There are a total of 22 agents working the campaign. An interactive option List} may enable the supervisor to call up a detailed interactive list of those agents.

Real time statistics indicate that there are 19 calls in the queue and 8 calls in progress, meaning 8 calls are currently being monitored and processed for information using the voice analytic tools described above. The estimated wait time (EWT) in queue is 4 minutes while the average handling time (AHT) for a call is 3 minutes. The current closing rate is 56% meaning 56% of the total number of calls resulted in a sale.

View 500 includes emotion detection system [ED-SYS Data] 502 for the group of interactions that are currently in progress. Of the 8 calls in progress, there are 2 calls where the caller is angry. A telephone icon displays each call having an angry caller and an indication of how long the call has been in progress. The freshest call with an angry caller is just 1.00 minute old. The next call with an angry caller is 2 minutes and 43 seconds old. With an average handling time of 3 minutes, the supervisor may elect to intervene only on the freshest call at 1:00 minute. Each of the call icons is interactive and can be manipulated to call up all of the information about the call, the caller, and the agent. An interactive option labeled Send Script is provided to the right of each troubled conversation. A supervisor may click on the option to call up a manual script selection interface. The supervisor may first highlight the conversation that she wants to influence and then may browse for or select a script from a list or pool of pre-defined scripts. Once the script is selected, hitting send automatically causes the script to be sent to the ASI of the agent in that conversation.

Also listed in parameters 502 is the total number of calls in the group of 8 calls in progress where the agent is angry. In this example only 1 call is in progress where the ED SYS has detected anger in the agent. A telephone icon represents that call. Next to the icon an indication is provided of the current age of the call, in this case 2 minutes and 10 seconds. A script or other intervention may be warranted for that call. Another set of real-time parameters 503 is provided below the ED-SYS Data. These data are Topic Detection system data [TD-SYS Data]. Of the 8 calls in progress, 5 of those have hot topics detected that are prevalent in the conversation. The 5 calls are listed in order from freshest call to the oldest call. In one embodiment the supervisor may mouse over any one of the displayed call icons to get the most prevalent topic of that call. The hot topic for the oldest call on the list is "Upgrade". Some conversations may be listed in more than one data set. On conversation may have a hot topic detected, an angry caller detected and an angry agent detected.

Caller verification alert bar 506 informs the supervisor of how many of the current conversations have callers who are suspect of fraud. In this example the number is 0 calls. This number should typically remain at 0 or very low with good security practices. A set of interactive options 505 is provided in view 500 beneath the standard parameters. For example, an option to add or subtract agents from the group (C) is presented. A supervisor may also be able to transfer agents from one group, say group C to another group say group D. A next interactive option allows a supervisor to perform a manual rerouting of a caller from one agent to another agent. This process may also be wholly automated using a script server. A next option enables the supervisor to send an up sell script to any agent involved in conversations.

View 500 has some pre-configuration options 504 that a supervisor may set prior to running a call campaign. A first option is let the system determine the best actions to pursue in the face of caller anger, top topic, agent anger, etc. In this case all of the routing and call transfer steps are automated. Another option is prompt me and ask me what to do. In this case the system only take corrective action at the bidding of the supervisor. The last option enables the supervisor to initiate all of the actions. In this case the supervisor selects and serves scripts and performs rerouting from the desktop. In a case where there may be hundreds of active calls automation may be the best rule whereas for small groups a human operator may manage the calls in progress.

Figure 6:
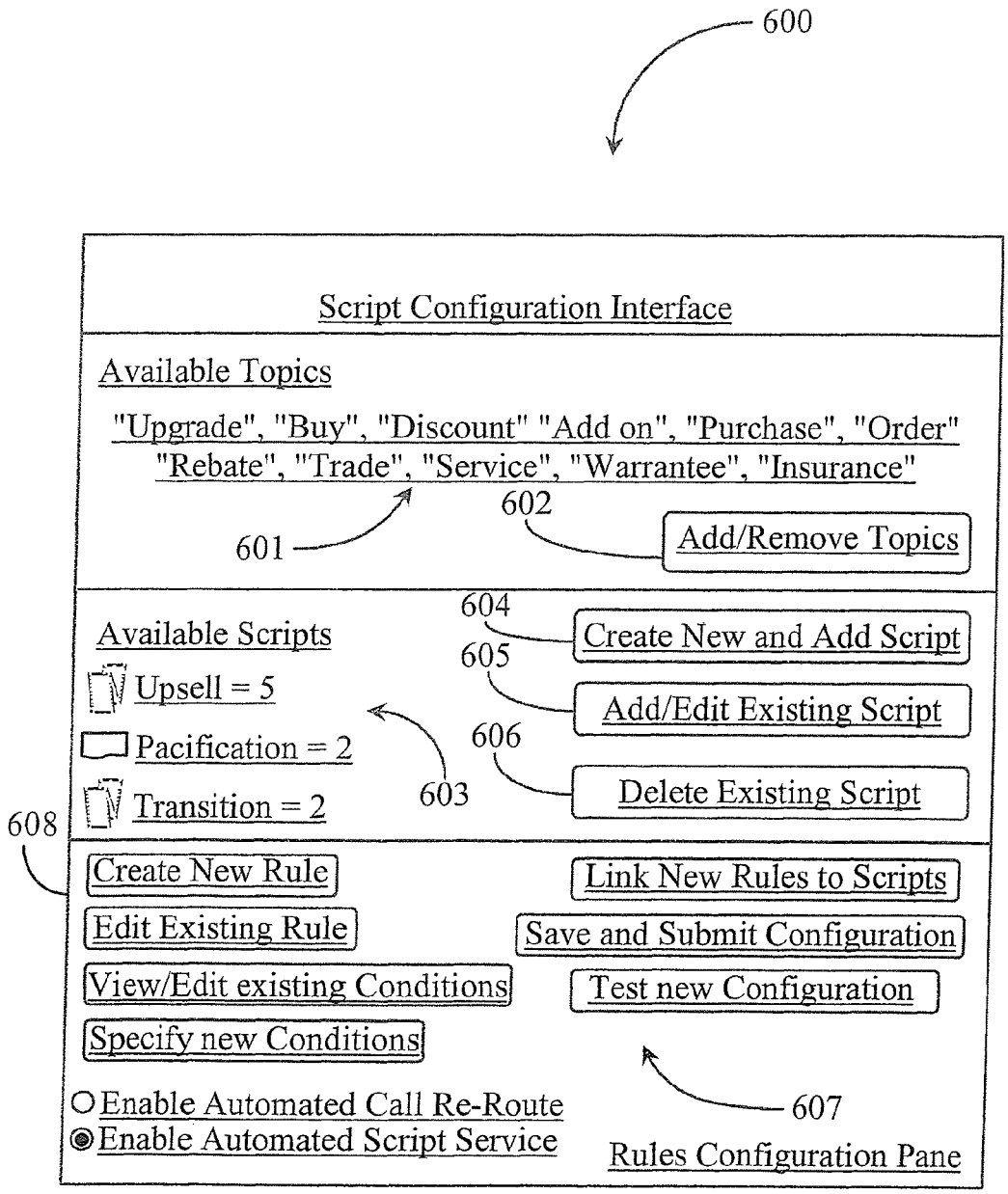
FIG. 6 is an exemplary screen shot of a script and rules configuration interface according to an embodiment of the present invention.

FIG. 6 is an exemplary screen shot of a script and rules configuration interface 600 according to an embodiment of the present invention. Configuration interface 600 may be a static part of the supervisor GUI for receiving reports. The interface has a title bar defining the window as a Script Configuration Interface. Interface 600 enables an agent to configure rules and to write scripts that may be selected for scripting service to agents in the field. The interface includes a visual list of available topics to write scripts about. The available topics are hot words that if spoken by a caller could cause the system to recommend a script. In interactive option 602 is provided to enable the supervisor to add or remove topical hot words. The hot words would be recognized during automated speech recognition performed by the ASR system. Hot words may also be parsed from text-based interactions in some embodiment of the present invention.

Script configuration interface 600 includes access to available scripts that have been pre-configured and stored in a repository analogous to the script repository 209 described with reference to FIG. 2. In this example, the supervisor has access to five available up sell scripts, two available pacification scripts, and two available transition scripts. An up sell script is an offer to upgrade or to purchase a higher priced product or product version. A pacification script might be used to calm an angry customer. A transition script is used to inform a customer that he or she will be redirected to a different agent to finish the transaction.

An interactive option 604 is provided within interface 600 to enable creating and adding new scripts to the pool of existing scripts. An interactive option 605 is provided that enables a supervisor to add or edit existing scripts. An interactive option 606 is provided that enables the supervisor to delete existing scripts from the pool of scripts. Scripts are selected by rule based on results of analysis of customer and/or agent behavior, topic detection and emotion detection. A speech analysis recommendation engine (SARS) described further above may be responsible for processing those results before a recommendation is made. A recommendation to script an agent may be passed to the supervisor interface (GUI 205) and the supervisor may have the last decision of whether to send a recommended script or to send a different script or no script. In one embodiment script selection and service is completely automated and occurs in the background without human input.

Interface 600 includes a rules configuration pane 608. There are several interactive options made available to a supervisor through rules configuration pane 608. An interactive option is provided that enables the supervisor to create a new rule. An interactive option is provided that enables the supervisor to edit an existing rule. A rule created to help decide whether to recommend a script or not depends on certain conditions that are inferred through voice analysis and text analysis (live text interaction). An interactive option is provided within rules configuration pane that allows the supervisor to view and edit existing conditions that might lead to rule application and subsequent selection of one or more scripts. In one embodiment more than one script might be recommended whereby the supervisor picks one of the list to send to a customer.

Configuration pane 608 also contains an interactive option for specifying new conditions for triggering rules. The exact conditions specified will depend on the nature of the campaign. An interactive option is provided within rules configuration pane for linking new rules to existing or newly created scripts. Interaction with any of the described options in configuration pane 608 may bring up new windows to facilitate the tasks specified by the option. An interactive option for saving and submitting a particular configuration of rules and scripts is provided as well as a link that enables testing a new configuration to determine if the results and rules applied in a situation lead to recommendation of the appropriate scripts or script.

Figure 7:
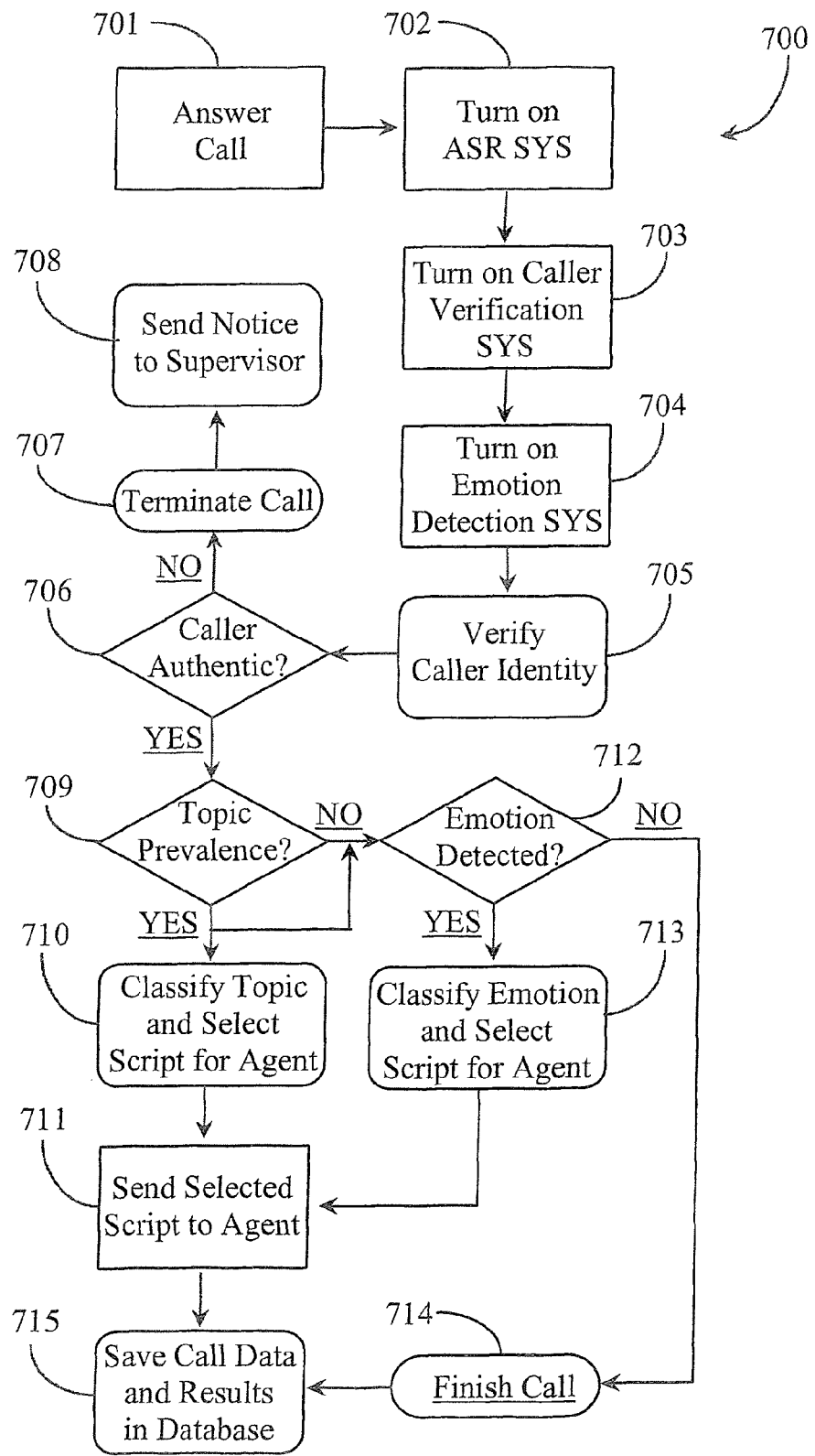
FIG. 7 is a process flow chart illustrating steps for analyzing voice during a call in real time and determining a script for an agent based on the results of analysis.

FIG. 7 is a process flow chart illustrating steps 700 for analyzing voice during a call in real time and determining a script for an agent based on the results of analysis. At step 701 a participating agent picks up a call from queue. The call may have been previously processed by IVR to determine internal routing strategy. At step 702 the system turns on the ASR system for the call. The call may or may not be recorded by default. In one embodiment all calls are recorded. In one embodiment the call recording system is turned on for each call that the system determines should be recorded.

At step 702 the system may select an ADR mode such as continuous voice recognition or hot word recognition. A feature of the ASR system for recognizing topics may be turned on or off by default. Typically topic detection is on by default for the purpose of generating system recommendations. The system may turn on the caller verification system at step 703. In one embodiment step 703 occurs only after the ASR system recognizes one or more security questions asked of the caller by the agent. The system may turn on the emotion detection system at step 704.

All of the features of the ASR system including topic and emotion detection may be run for the caller's voice only or for both the caller and the agent. In one embodiment certain agents will be monitored while certain other agents in the group may not be monitored. Typically all callers would be monitored but it is possible to selectively monitor calls while other calls are not monitored. At step 705 the system attempts to verify the callers identity. In one embodiment the ASR system recognizes a security question and then listens with emotion detection and topic detection turned on to determine if the question is answered correctly and if so was it an uncomfortable answer for the caller. For example, is the security question was "What is your date of birth" and the caller has a hard time responding even though the right answer is given, the system may make a determination whether the caller is who the caller claims to be at step 706.

If the caller verification system determines that the caller identification cannot be confirmed, then at step 707 the call may be terminated and a fraud alert may be sent to the managing supervisor at step 708. There may be several differing schemes for verifying the identity of a caller including matching voice pattern of the caller with a voice pattern of the caller that is kept on file at the call center. Generally if the caller successfully answers one or more security questions without much hesitation the caller ID is confirmed. The system of the invention is compatible with most security regimens such as are used by financial institutions and the like.

If the caller verification system confirms the identity of the caller at step 706, then as the call is being handled, the system checks if any prevalent topics can be discerned for the ensuing conversation at the current time in step 709. If no hot words or topics are identified by the system in step 709, the system may determine subsequently or at the same moment if there is any significant emotional state detected in the conversation. For example, the caller may become frustrated or the agent may become frustrated or crass. If no topics could be verified and no adverse emotional states are detected, then the process may skip to step 714 where the agent finishes the call without any outside influence.

It is noted herein that the steps of topic and emotion detection may be continually running during the life of the conversation and either system will take action if triggered by topic recognition or by the recognition of an emotional state or by both. It is also noted that detection of a prevalent topic or topics in a conversation may be confirmed while no significant emotional state can be determined. Likewise, an emotional state may be determined without topic recognition being successful for a conversation.

At step 709 if the system detects a prevalent topic for the conversation, the system classifies the topic and at step 710 and may also select a script for the agent to read at step 711. In one embodiment if a topic is detected that might lead to script service to the agent, the system waits until the emotional state of the caller and/or agent is confirmed if any. In one embodiment a topic may be detected and a script selected based on the topic but before a script is sent, the emotion detection system determines that the caller is angry. A script for an angry caller may be more important than a script offering an up sell to the caller and therefore may take priority in any given conversation. After step 709 regardless of whether a topic was found or not, the system moves to step 712 for emotion detection unless that feature is purposely turned off for the call.

If topic prevalence for the conversation is determined at step 709 then at step 710 the topic is classified and the agent of the call is notified to receive a script at step 711 as part of the system recommendation described further above with reference to FIG. 3. If the topic detection system confirms a topic the system will still check for emotional states of the caller at step 712. At step 712 if emotion is not detected and no topic is detected at step 709, then the process may skip to step 714 where the agent finishes the call as mentioned above.

If a significant emotional state is detected in the conversation at step 712 the system may classify the emotion and may select a script for the agent at step 713. If an emotional state is detected and classified, the system may wait to see if a topic could be detected. For example, the emotional state detected in the caller's voice may be one of excitement and the topic that is prevalent might be "new system", in which case the script triggered by the topic, perhaps and up sell script, is validated as well be the emotional state of the caller.

If two different scripts are selected for an agent in a conversation, one relative to topic and one relative to emotion, the system may enable the agent to make a choice of which script to actually read to the caller. In one embodiment the supervisor may make the final decision over which of two widely variant scripts will be read to the caller. In still another embodiment, an automated routing may weigh the selected scripts against all of the rules and make a determination of which script is most important like a tiebreaker routine. Obviously an angry caller would not be a good candidate to be read an up sell script based on a prevalent topic. Emotional states may range from anger, frustration, confusion, and melancholy to happy, excited, and ecstatic.

After the recommended script is sent to the agent at step 711, ultimately the system will save all of the call data including all of the results in a historical database for reporting. It is noted that real time reporting may include reporting of both real time information or states and static information that is the same every report like standard customer data. In one aspect a supervisor may screen a custom report to see only the real-time data. In one embodiment a supervisor may elect to physically monitor all connected conversations from a dashboard style interface such as may be accessed using GUI 127 or GUI 205. In this case the supervisor may choose which calls to monitor and which calls to let go. In one aspect the supervisor may configure topic detection and emotion detection to automatically turn on for a conversation that exceeds the AHT for a call or some other time limit imposed on the conversation. There are many possibilities.

Figure 8:
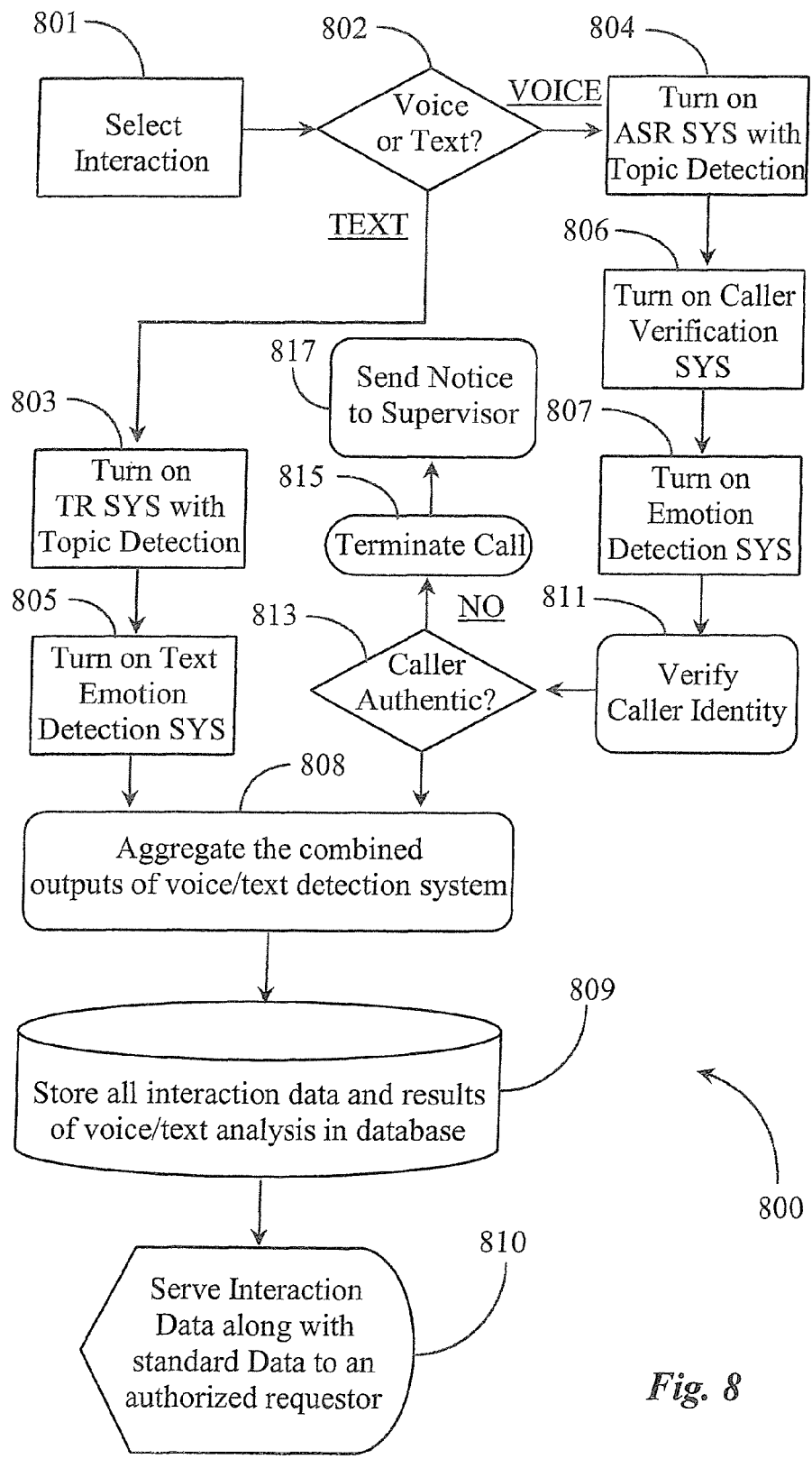
FIG. 8 is a process flow chart illustrating steps for interaction analysis and historical reporting according to an embodiment of the present invention.

FIG. 8 is a process flow chart illustrating steps 800 for interaction analysis and historical reporting according to an embodiment of the present invention. At step 801 the system selects an interaction to process. Typically, in an open media queue the interaction may be a voice-based interaction (call) or a text-based interaction request (Chat, IM). At step 802 the system determines if the interaction is a voice interaction or a text interaction. At step 802 if the interaction is a voice interaction then the system turn on the ASR system with topic recognition at step 804. The system also turns on the caller verification system at step 806 and the emotion detection system at step 807.

If the interaction of step 801 is determined a text interaction at step 802 then the process moves to a process branch beginning with step 803 for turning on a text recognition system with topic detection. Then the system turn on a text-based emotion detection system, which looks for hints of emotional state within the typed text of a text interaction.

For the voice-based branch of process steps 800 the system attempts to verify the ID of the caller at step 811. At step 813 the caller verification systems decides if the caller is authentic. If the caller is judged not to be authentic at step 811, then the process moves to step 815 where the call may be terminated. In that case a notice of fraud may be sent to the managing supervisor in charge of the agent group at step 817. If the caller is determined to be authentic at step 813 then the call is monitored for topic and emotion detection and the outputs of those systems may be combined and aggregated for the call at step 808.

For the text-based branch of process 800 the outputs of the text-based versions of the topic detection and emotion detection systems are combined and aggregated for the text interaction at step 808. At step 809 all of the interaction data and results of voice/text analysis are stored in the historical database managed by a real time reporting tool or server analogous to server 301 of FIG. 3. At step 810, the reporting server may serve the interaction data including results of analysis along with standard data to an authorized requestor such as a managing supervisor. Each interaction in progress may be viewed in real time through a GUI dashboard style interface for both text-based and voice-based interactions. In one embodiment the supervisor or manager may select and send scripts to agents in real time based on analytic results whether the interaction is a voice call, a chat session or an instant message session in progress. Moreover, the historical record is supplemented with group statistics about topic preference and emotional states of interaction participants. These stats may be mined for useful information that may aid in refining scripts, processes, voice applications, and other call center processes and objects.

It will be apparent to one with skill in the art that the interaction participant monitoring and reporting system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. An apparatus for managing interactions for a contact center, comprising:
   a processor; and
   a memory coupled to the processor and storing instructions that, when executed by the processor, cause the processor to:
   analyze a real-time communication with a customer;
   detect a topic or an emotional state of the customer or contact center agent based on the analyzed communication;
   provide on a graphical user interface accessible to a supervisor of the contact center agent, data relating to the detected topic or emotional state; and
   receive, in response to interaction by the supervisor with the graphical user interface, selection of an action to be taken in response to the topic or the emotional state, wherein the action includes providing real-time advice to the contact center agent.

2. The apparatus of claim 1, wherein the real-time advice comprises a script for guiding the contact center agent.

3. The apparatus of claim 1, wherein the instructions further cause the processor to verify an identity of the customer, and the providing of the real-time advice to the contact center agent is, at least in part, in response to the identity of the customer being verified.

4. The apparatus of claim 1, wherein the action comprises rerouting the customer from the contact center agent to another contact center agent.

5. The apparatus of claim 1, wherein the analyzing of the real-time communication further comprises monitoring an answer by the customer to a security question for detecting fraud.

6. The apparatus of claim 5, wherein the data further comprises statistics of how many current conversations have customers who are suspected of fraud.

7. The apparatus of claim 1, wherein analyzing the real-time communication further comprises comparing a voice of the customer to a voice sample.

8. The apparatus of claim 1, wherein the real-time communication comprises a text communication.

9. The apparatus of claim 8, wherein the instructions further cause the processor to analyze the text communication for detecting the emotional state of the customer or contact center agent based on phrase interpretation, character state interpretation, or emotion icon recognition.

10. A method for managing interactions in a contact center, comprising:
    analyzing, by a processor, a real-time communication with a customer;
    detecting, by the processor, a topic or an emotional state of the customer or a contact center agent based on the analyzed communication;
    providing, by the processor, on a graphical user interface accessible to a supervisor of the contact center agent, data relating to the detected topic or emotional state; and
    receiving, by the processor, in response to interaction by the supervisor with the graphical user interface, selection of an action to be taken in response to the topic or the emotional state, wherein the action includes providing real-time advice to the contact center agent.

11. The method of claim 10, wherein the real-time advice comprises a script for guiding the contact center agent.

12. The method of claim 10 further comprising:
    verifying, by the processor, an identity of the customer, wherein the providing of the real-time advice to the contact center agent is, at least in part, in response to the identity of the customer being verified.

13. The method of claim 10, wherein the action comprises rerouting the customer from the contact center agent to another contact center agent.

14. The method of claim 10, wherein the analyzing of the real-time communication further comprises monitoring, by the processor, an answer by the customer to a security question for detecting fraud.

15. The method of claim 14, wherein the data further comprises statistics of how many current conversations have customers who are suspected of fraud.

16. The method of claim 10, wherein analyzing the real-time communication further comprises comparing, by the processor, a voice of the customer to a voice sample.

17. The method of claim 10, wherein the real-time communication comprises a text communication.

18. The method of claim 17, further comprising analyzing, by the processor, the text communication for detecting the emotional state of the customer or contact center agent based on phrase interpretation, character state interpretation, or emotion icon recognition.

* * * * *